Nov. 4, 1930.   J. L. HAGEL   1,780,186

HITCH

Filed Nov. 1, 1929

INVENTOR
JOHN L. HAGEL
BY
ATTORNEY

Patented Nov. 4, 1930

1,780,186

UNITED STATES PATENT OFFICE

JOHN L. HAGEL, OF ST. PAUL, MINNESOTA, ASSIGNOR TO THE HAGEL WAGON SPRING BOLSTER CO., OF ST. PAUL, MINNESOTA, A CORPORATION OF MINNESOTA

HITCH

Application filed November 1, 1929. Serial No. 404,150.

This invention relates to hitches for connecting vehicles, and the primary object is to provide an efficient, practical, and comparatively simple and inexpensive hitch device that has a variety of uses but is particularly adapted for the purpose of detachably connecting a trailer to a motor vehicle. Further and more specific objects will be disclosed in the course of the following specification, reference being had to the accompanying drawing, in which.

Figure 1:
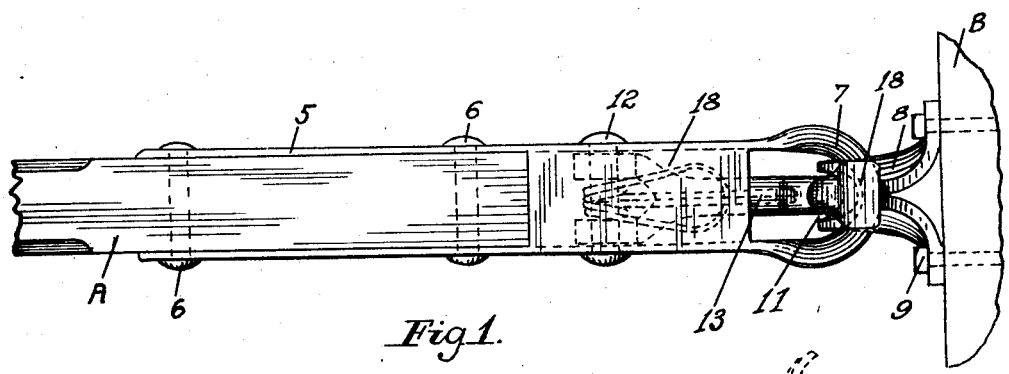
Fig. 1 is a top or plan view of the hitch.

Referring to the drawing more particularly and by reference characters, A designates the tongue of a trailer or vehicle to be drawn, and B designates the automobile, truck or other vehicle that is to draw the trailer. It is understood that when a vehicle such as a trailer cart is to be connected to a motor vehicle the connection or hitch must be such as to permit a substantially universal action between the tongue and the pulling vehicle, and it is also obvious that the connection must be positive, strong, and, if possible, should also be quickly attachable and detachable, and should also be free from vibrations and rattles in order that it may be operated smoothly and without creating disturbing noises.

Figure 3:
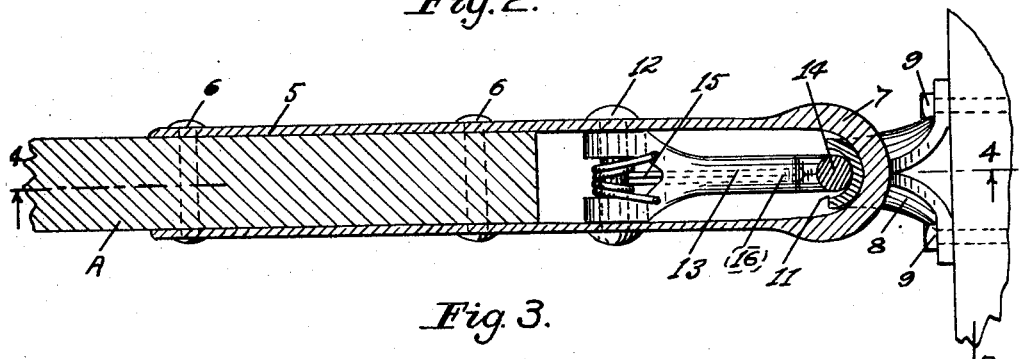
Fig. 3 is a sectional plan view on the line 3—3 in Fig. 2.
Figure 4:
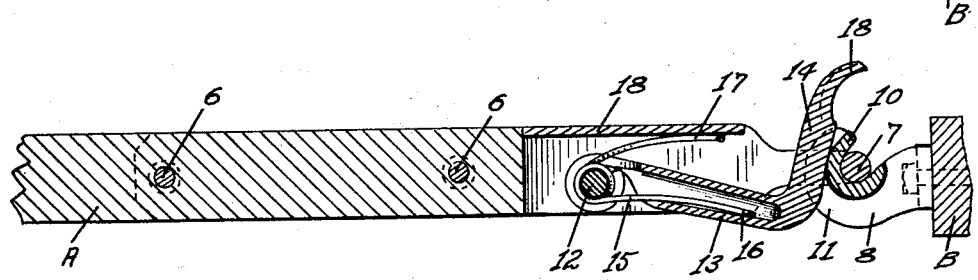
Fig. 4 is a sectional elevation on the line 4—4 in Fig. 3.

To the end that these desirable characteristics and advantages may be realized, and also with the idea in mind that simplicity and economy in manufacturing costs may be effected in so far as possible, I provide the tongue A with a U-shaped bracket member 5, the rear ends of the side portions of which are rigidly secured to the tongue as by bolts or rivets 6. The front or closed end of the U-shaped member 5 is reduced, vertically, and formed into an arc shaped or rounded bearing member 7 (Figs. 1 and 3), which member is circular in cross section, as shown in Fig. 4. With hitch in connected condition the bearing member 7 is engaged by a hook 8 that is permanently or at least rigidly secured, as by bolts 9, to the pulling vehicle B. The conformation of the hook 8 is of considerable significance. In the first place it will be noted that its end 10 inclines sufficiently forward (Figs. 2 and 4) so that it cannot vertically disengage the bearing member 7 unless and until the latter is moved forwardly with respect to the hook end 10. Secondly, the hook is curved, in horizontal cross section (Fig. 3), and in vertical cross section, as in Fig. 4, so that it will always have an adjustable yet proper bearing contact with the bearing member 7. In addition to the surface curves just noted the hook 8 is further provided, at what may be designated as its back, with an arc shaped channel 11, extending from the end 10 downwardly and forward, the contour or surface of which channel runs substantially parallel to the front surface engaging the bearing rod 7.

A bolt or rivet 12 is secured between the side arms of the bracket 5, in advance of the end of the tongue A, and to it is pivotally secured an L-shaped lever 13, the forward arm 14 of which is so disposed with respect to the fulcrum 12 that when pressed downwardly will tend to clamp the hook 8 between itself and the bearing bar 7. As shown in Fig. 3, the arm 14 is circular in cross section and engages in the channel 11, and this contact between the arm 14 and the hook 8 is consequently such that the arm (when down) will always securely engage the hook 8 to hold it locked, yet will not interfere with the oscillating actions of the hook with respect to the bar 7 as the vehicles travel over the road.

The lever 13—14 is normally held down in its locking position by a spring 15, that is coiled about the pivot 12 with one end engaging the lever 13, as at 16, while the other end 17 is anchored against a plate 18. This plate connects the upper edges of the side arms of the bracket 5, and may be made integral therewith, as by welding. In any event the plate portion, in addition to serving as a stop or anchor for the spring end 17, also operates to reinforce or strengthen the bracket arms in advance of the tongue end so that they cannot bend or become laterally distorted under the strain of jerks and jars to which they are subjected.

Figure 2:
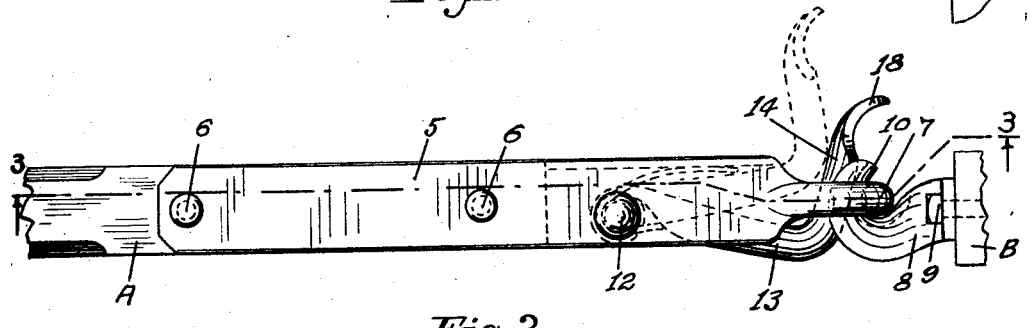
Fig. 2 is a side elevation of the hitch.

At the upper end of the lever arm 14 the same is provided with a finger grip 18, and only when this is engaged and lifted to the dotted line position shown in Fig. 2 can the device be disconnected. At all other times the arm 14 automatically secures the hook 8 and bar 7 in proper operative and interlocked positions, under the action of the spring 15, and the contacting angle of the arm 14 against the hook is such that it cannot be moved upwardly under any normal action of the hook, thus insuring against an accidental disconnection.

It is understood that suitable modifications may be made in the structure as disclosed, provided such modifications come within the spirit and scope of the appended claims.

Having now therefore fully illustrated and described my invention what I claim to be new and desire to protect by Letters Patent is:

1. A hitch for detachably connecting a tongue to the rear of a pulling vehicle, comprising a hook member secured to the vehicle, a bracket member secured to the tongue and having a curved bar portion for engagement with the hook, a lever member carried by the bracket for engagement against the hook, said hook being provided at its rear with a recess to receive the lever.

2. A hitch for detachably connecting a tongue to the rear of a pulling vehicle, comprising a hook member secured to the vehicle, a bracket member secured to the tongue and having a curved bar portion for engagement with the hook, a lever member carried by the bracket for engagement against the hook, said bar portion of the bracket being substantially circular in cross section at its point of engagement in the hook.

3. A hitch comprising a hook for rigid attachment to the rear of a vehicle, a coupling member for attachment to a second vehicle to be drawn behind the first mentioned vehicle, said coupling member having an arcuate bar portion for engagement in the hook, a fastener for holding the hook and bar in interlocked positions, said hook having a channel in its rear to pivotally receive the fastener.

4. A hitch comprising a hook for rigid attachment to the rear of a vehicle, a coupling member for attachment to a second vehicle to be drawn behind the first mentioned vehicle, said coupling member having an arcuate bar portion for engagement in the hook, a fastener for holding the hook and bar in interlocked positions, said hook having a channel in its rear to pivotally receive the fastener, the inner surface of the hook being curved, transversely and vertically, whereby it will have universal pivoting contact with the hook.

Signed at Minneapolis, Minnesota, this 28th day of October, 1929.

JOHN L. HAGEL.